INVENTOR.
Richard E. Knutson
BY
Roland A. Anderson
Attorney

DIGITAL DATA SORTING LOGIC SYSTEM

Filed Sept. 21, 1966 4 Sheets-Sheet 2

INVENTOR.
Richard E. Knutson
BY
Attorney

INVENTOR.
Richard E. Knutson
BY
Roland A. Anderson
Attorney

INVENTOR.
Richard E. Knutson
BY
Attorney 3,411,146

DIGITAL DATA SORTING LOGIC SYSTEM

Richard E. Knutson, Albuquerque, N. Mex., assignor to the United States of America as represented by the United States Atomic Energy Commission Filed Sept. 21, 1966, Ser. No. 581,420
8 Claims. (Cl. 340—172.5)

This invention relates to a system for electrically sorting digital data and more particularly to a system that performs logic in organizing digital data in constructing a histogram presentation.

Quite often when repeated electrical tests are performed, the actual readings, when observed individually, have little meaning. It is only when these readings are combined with other similar readings that the resulting information is analyzed. This analysis often amounts to organizing the various readings into a frequency distribution (histogram) and then observing the various parameters of the histogram, such as the mean and variance. In the past, when information displays such as histograms have been required, they have been obtained in devious ways. Often the individual readings are noted and the histogram is laboriously constructed by manual means. Sometimes histograms are constructed automatically by computers. This, however, is often complicated, as the data to be used in constructing the histograms is typically a series of numbers written on a data form. To get the data in a format which is usable by the computer requires a manual keypunch operation. This operation is quite laborious, besides being costly, time consuming, and error-prone. Some automated test equipment provides data outputs which are immediately in a format which is compatible with digital computers. Such outputs are typically punched cards or punched paper tape. While these systems do provide a capability for a rather rapid system for data reduction, the expense of the equipment, including computer time, is appreciable. Industry in general appears to have realized some of the shortcomings of data systems which require recording of the individual bits of data when all that is really required is a frequency distribution. Several instruments have been developed which provide histograms directly from a series of voltage readings. These existing instruments, however, are quite expensive and relatively inflexible in their application since they are complete systems within themselves. That is, they are a combination of a voltmeter and a display device. This design makes them fairly expensive because all the controls associated with the voltmeter and all the circuitry required to establish voltage levels are included in the device. They are inflexible in that they can only sense voltage and they have a fixed amount of precision and accuracy.

The present invention is directed to a logic system that receives digital data from any one of several types of electrically operated digital readout devices and sorts this data into a plurality of storage registers. As to the electrically operated digital readout device, there are several types; for example, a digital voltmeter, an r.p.m. counter, or a frequency counter. Each of these instruments produces a voltage output to an indicating device for each particular decimal position; and it is this voltage which is employed for energizing the logic circuits of the present device. The storage registers referred to can be any type of indication which can be electrically energized to record in what range of numbers a given bit of test data should be placed. Numerical counters, when used as these indicators, are quite useful since the total entries can be indicated in a single column and the total counts can be added to see if this column agrees with the number of tests completed plus an immediate count of test results that fall within acceptable limits. A survey of how many digits should be monitored indicated that three significant figures would satisfy the majority of requirements for typical test programs. This means that the digital positions in the 100's, 10's, and units can be used for the data to be received from the electrically operated digital readout device and which are logically sorted into a plurality of storage registers. The present digital data sorting logic system requires ten conductive paths from the electrically operated digital readout device for each of the three digital positions in the 100's, 10's, and units. These conductive paths are connected to various logic circuits and three separate gang switches for selecting the first, second, and third digit. The third gang switch not only selects the third digit to establish a center numerical value but the increment that is to be added to the center value. Since test data may also fall above upper limits or below lower limits, logic circuitry is provided to indicate these conditions. The plurality of storage registers are connected through logic circuits with a center storage register for accepting the center or mean value of the data received and the other storage registers accepting the ascending and descending preselected deviation in data from the mean value. This deviation from the center value can be selected according to how great a deviation is expected of the test data. For each bit of test data to be entered into the storage registers, the digital readout device is interrogated. This interrogation amounts to generating a signal which allows the numbers displayed by the digital readout device to be processed through the logic circuits and switches which will result in indicating in which storage register the data should be placed. This occurs if the test data falls within the preselected limits. Should the test data fall above upper limits or below lower limits, the interrogate signal will permit the test data to be processed through the logic circuits necessary to energize an above or below limits indicator.

It is an object of this invention to provide a data sorting logic system that, when connected to an electrically operated digital readout device, can sort the digital data into storage registers in accordance with a predetermined digital separation from a selected center value.

A further object of the present invention is to provide an indication when test data is below lower limits or is above upper limits.

Still another object of this invention is to provide logic circuitry which can take test data and, with the aid of an electrically operated digital readout device, sort this data into storage registers having preselected deviation from a center value and which further provides electrical energy from the storage registers to activate a histogram display device attached thereto.

This specification, including the description, drawings and claims, has been prepared in accordance with the applicable patent laws and the rules promulgated under the authority thereof.

*Sorting logic system*

The embodiment of this invention, which is described herein, is described in connection with data being supplied from an electrically operated digital readout device and one example is a digital voltmeter which will be used in setting forth the invention. The invention will be described in connection with constructing a histogram display which can be any electrically responsive device associated with the storage registers and one example is a numerical counter connected to each storage register. Accordingly, although the invention is described in connection with a digital voltmeter and counters for constructing a histogram, it is to be understood that this is not to be construed as a limitation on the invention since it is well within the skill of one versed in the art that r.p.m. counters and frequency counters will provide digital data and that lights, columns of steel balls, and pen recorders will provide a histogram display.

The embodiment of this invention should not be limited to providing a histogram display but can be employed for indicating when items under test are within, or out of, prescribed tolerances or indicate a trend of the quality of items under test. In the first application, a good and bad indication may be all that is required; while in the second application, indication by individual columns may be necessary. The invention provides for indication when an item under test is below lower limits or above upper limits of the prescribed value; and this may be all the indication that is required for accepting all items under test falling within these prescribed limits.

Figure 1:
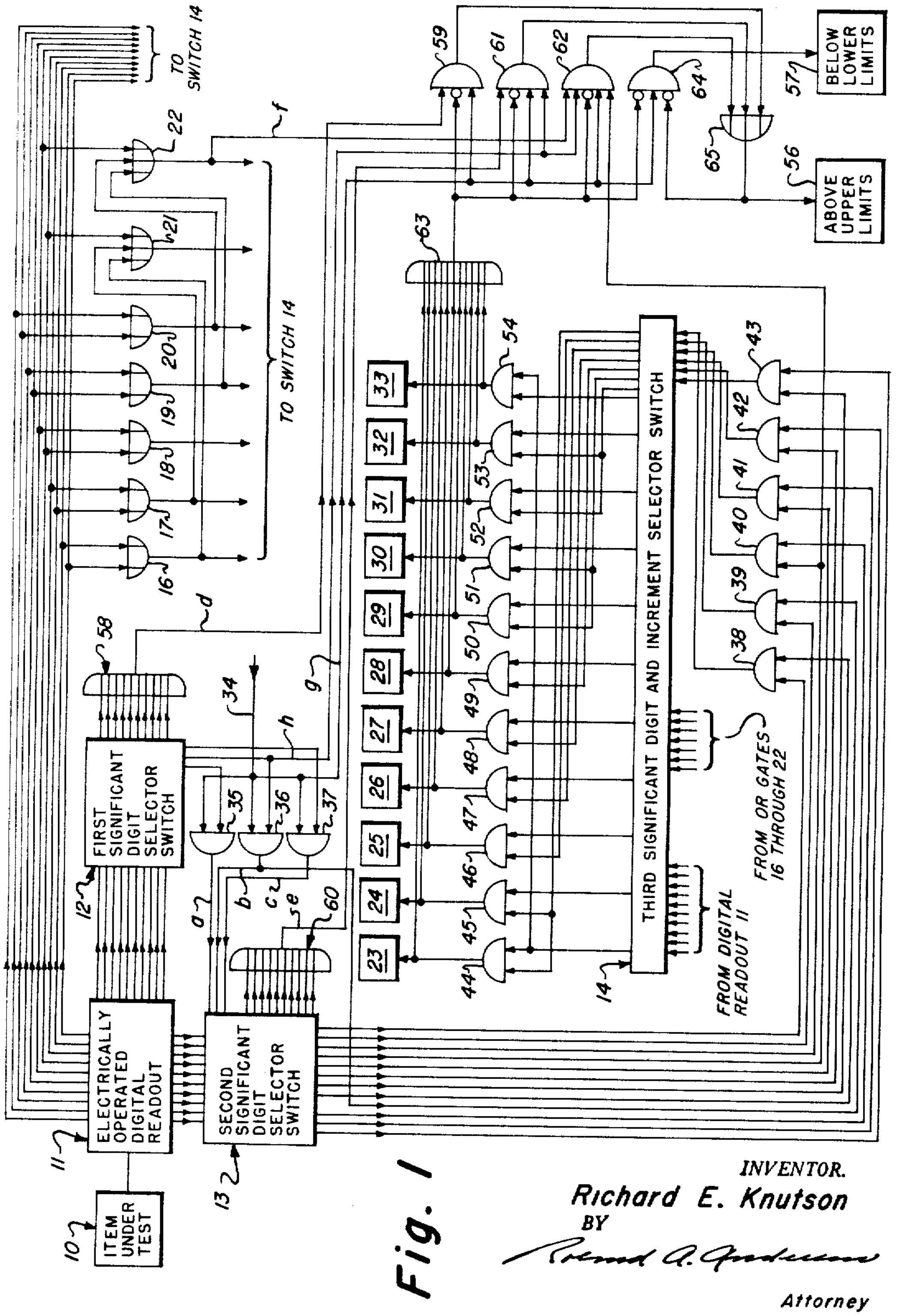
FIG. 1 is a schematic diagram illustrating the logic circuits incorporated in the digital data sorting logic system.

Referring now to FIG. 1, the items under test 10 represented by a rectangle must be capable of rendering an analog voltage to the digital voltmeter 11, also illustrated as a rectangle. A digital voltmeter having digit display requires an electrical potential for activating the individual digits in the 100's, 10's, and units display. By a slight modification, thirty conductors are connected to the output terminals of the digital voltmeter, one for each digit in the 100's, 10's, and units. Ten of these conductors from the 100's output terminals are connected to terminals of the first significant digit rotary selector switch 12, referred to hereinafter as the 100's inputs, and ten conductors from the 10's output terminals to the terminals of the second significant digit selector switch 13, referred to hereinafter as the 10's inputs. The ten conductors from the units output terminals are connected to the third significant digit rotary switch 14, referred to hereinafter as the units inputs. The 100's inputs are numerical values of 000 through 900 with consecutive first digits; while the 10's inputs are numerical values of 00 through 90 with consecutive first digits; and the units inputs are numerical values of 0 through 9. These same conductors from the output terminals of digital voltmeter 11 are connected to OR gates 16 through 22, while the output of these OR gates are also connected to terminals of rotary switch 14. It will be shown that switch 14 not only selects the third significant digit but also selects the increments to be added to the center storage register and, consequently, to all other storage registers. In the embodiment of this invention, eleven storage registers are shown numbering from 23 through 33 which utilize storage register 28 for storing the preselected center numerical value; while the other storage registers are connected to store an arithmetic progression of numerical values for storage registers 29 through 33 as opposed to storing the arithmetic retrogression of numerical values in storage registers 27 through 23. Having the storage registers connected in this manner will provide a typical histogram display on the numerical counters activated by the storage registers.

Each time data is to be entered into the storage registers, an interrogate signal is applied to conductor 34 which, in turn, is applied to one of the inputs of each of AND gates 35, 36, and 37. This interrogate signal is a small DC potential and equals approximately the electrical potential from the output of digital voltmeter 11. According to the logic of switch 12, the electrical potential from digital voltmeter 11 may also be applied as a second input of AND gates 35, 36, or 37. It is well known in logic circuits that an AND gate will not transmit an output signal unless both input signals are present. Further details of the conductive paths through rotary switch 12 and the input conductors to AND gates 35, 36, and 37 will be described below in connection with FIG. 2. Also the signal over conductors *a*, *b*, and *c* from the outputs of AND gates 35, 36, and 37 through rotary switch 13 will be described in detail in connection with FIG. 3.

The data received for the first two digits are combined by the logic of rotary switches 12 and 13 and com- the center value storage register. Each of the AND gates require two input signals; thus 11 conductors are shown from rotary switch 13. However, one of the inputs to AND gate 40 comes directly from the output of AND gate 36 over conductor *b*. This direct path is a consequence of the fact that AND gate 40 is associated with the center value storage register. Each of the AND gates 38 through 43 will function to receive one input from the 100's and one from the 10's inputs. If a signal in the 100's and 10's inputs is transmitted from digital voltmeter 11 which corresponds to the center value selected, this same signal will be further transmitted through switch 12 through AND gate 36, to AND gate 40 and, when an interrogate signal is applied, a single signal is applied to control AND gate 49. This AND gate is the control for the center storage register 28 and is one of eleven output AND gates numbered between 44 and 54. As previously pointed out, rotary switch 14 not only selects the third significant digit but also selects the number of increments added to the center storage register 28.

An explanation of selecting the third significant digit and the number of increments to be added to the center value will be given by presenting the values chosen as example only for the embodiment of this invention and tabulated values for the storage registers shown in Table I. Storage registers 23 through 33 are shown across the top of the table.

TABLE I

| Position of Selector Switch 14 | Position of selector switch 12 at 100<br>Position of selector switch 13 at 10 | | | | | | | | | | |
|---|---|---|---|---|---|---|---|---|---|---|---|
| | Storage Registers | | | | | | | | | | |
| | 23 | 24 | 25 | 26 | 27 | 28 | 29 | 30 | 31 | 32 | 33 |
| 5 | 110 | 111 | 112 | 113 | 114 | 115 | 116 | 117 | 118 | 119 | 120 |
| 0 | 105 | 106 | 107 | 108 | 109 | 110 | 111 | 112 | 113 | 114 | 115 |
| 0-1 | 100<br>101 | 102<br>103 | 104<br>105 | 106<br>107 | 108<br>109 | 110<br>111 | 112<br>113 | 114<br>115 | 116<br>117 | 118<br>119 | 120<br>121 |
| 4-5 | 104<br>105 | 106<br>107 | 108<br>109 | 110<br>111 | 112<br>113 | 114<br>115 | 116<br>117 | 118<br>119 | 120<br>121 | 122<br>123 | 124<br>125 |
| 5-9 | 90<br>91<br>92<br>93<br>94 | 95<br>96<br>97<br>98<br>99 | 100<br>101<br>102<br>103<br>104 | 105<br>106<br>107<br>108<br>109 | 110<br>111<br>112<br>113<br>114 | 115<br>116<br>117<br>118<br>119 | 120<br>121<br>122<br>123<br>124 | 125<br>126<br>127<br>128<br>129 | 130<br>131<br>132<br>133<br>134 | 135<br>136<br>137<br>138<br>139 | 140<br>141<br>142<br>143<br>144 |

In compiling Table I, the first significant digit from the 100's inputs selected is 1, while the second significant digit selected from the 10's inputs for the tabulation is also 1. The third significant digit from the units inputs and the number of increments to be added to the center value are shown for five positions of 5, 0, 0–1, 4–5, and 5–9, which are shown in the first column of Table I. The center values selected are shown under storage register 28. In positions 5 and 0, no increment is added to the center value; however in 0–1, and 4–5 it can be seen that two increments are added to the center value; while in position 5–9, five increments are added. Other combinations of significant digits and increments that can be added for selector switch 14 can be employed with circuit modifications. Table I will be used in the specification as an example in describing the switch positions of FIGURES 2, 3, and 4.

Now it can be seen that one of the output AND gates 44 through 54 receives a signal from one of the combining AND gates 38 through 43 for the first two digits received from digital voltmeter 11 and also receives a second signal from the third digit received from digital voltmeter 11 to activate the storage register connected thereto.

When analyzing a plurality of test items, it is desirable to indicate those items that fall above upper limits or below lower limits. Indicator 56 indicates all items under test that fall above the upper limits of the storage register while indicator 57 indicates all items under test that fall below the lower limits of the storage registers. An explanation of the logic that occurs when digital voltmeter 11 produces a digital output value greater, or less than, the predetermined limits of storage registers 23 through 33 will be described below. An OR gates 58 is associated with rotary switch 12 and has parallel connections with the ten conductors for the 100's inputs from digital voltmeter 11. This OR gate provides an output signal from any one of the signals received on the 100's inputs above the significant digit selected on rotary switch 12. Thus if 100 is selected on rotary switch 12 from the 100's inputs, then a signal is passed through OR gate 58 for any signal received on any of the other 100's inputs that is greater than 100. This signal is then transmitted on conductor *d* to one of the inputs of control AND gate 59. This control AND gate and others to be discussed have the provision that the AND gate only provide an output when there is an absence of a signal on one or more input. The controlling absence of signal input terminal is indicated by a circle. An OR gate 60, similarly connected as OR gate 58, is associated with rotary switch 13 and has parallel connections with the ten conductors from the 10's inputs from digital voltmeter 11. This OR gate 60 will permit a signal when the 10's inputs provides a signal that is above the second significant digit selected. A signal through OR gate 60 is transmitted on conductor *e* to one of the inputs of control AND gate 61. For the units, OR gate 22 will pass a signal for any value received from digital voltmeter 11 that is 5 or above, and the signal is transmitted on conductor *f* to one of the inputs of control AND gate 62. OR gate 63 has an input connected from each of the output terminals from output AND gates 44 through 54 and provides an output signal when any one of the output AND gates is activated. Here it can be seen that if any one of the output AND gates is activated the data received must have been within the limits of the storage registers. Also, the absence of an input signal on OR gate 63 indicates that the data received is above or below the limits of the storage registers. The output from OR gate 63 is connected to one input of each of the control AND gates 59, 61, and 62 which control the above upper limits indicator 56 and to one of the inputs of control AND gate 64 which controls the below lower limits indicator 57. Control AND gate 64 has two absences of signal input terminals; one is from OR gate 63, while the other is from OR gate 65.

An explanation of the logic that occurs when data is received from digital voltmeter 11 which is above or below the limits of the storage registers will be described below with examples and with reference to Table I. Let it be assumed that the first significant digit selected on selector switch 12 from the 100's inputs is 100; the second significant digit selected on selector switch 13 from the 10's inputs is 10; and the third significant digit selected on selector switch 14 from the units inputs is 0. By referring to Table I, it can be seen from what has been assumed that the center value for storage register 28 is 110. In the first instance, let it be assumed that the data received from the 100's is 200. This is the next higher digit than was selected on selector switch 12. Thus OR gate 58 will provide a signal to control AND gate 59 and there will be an absence of a signal from OR gate 63 because the data received above 115 is above the upper limits of storage register 33 as can be seen from Table I. An interrogate signal on conductor *g* applied to control AND gate 59 will provide an output signal to OR gate 65 and activate above upper limits indicator 56. In the second instance, let it be assumed that the digit in the 10's inputs is 20 or more, which is higher than the 10 selected on selector switch 13. OR gate 60 will pass a signal along conductor *e* to control AND gate 61 and again, since the data received has a second digit of 20 or more which would make a total received above the limit of 115 for storage register 33, there will be an absence of signal from OR gate 63. A signal from rotary switch 12 applied to control AND gate 61 along conductor *h* indicates that the first digit from 100's inputs was equal to the first digit selected. When an interrogate signal is applied to control AND gate 61, a signal is transmitted to OR gate 65 thus activating above upper limits indicator 56. In the third instance, let it be assumed that the data received from 100's and 10's inputs is as selected but the units input is 6 or more; and in this example let it be assumed that 6 was received. The signal on 6 from the units inputs will be received on OR gate 19 which, in turn, passes a signal to OR gate 22 which then passes the same signal to control AND gate 62. Also, control AND gate 62 receives a signal from selector switch 13 indicating that the first and second values selected are within limits. Since 116 is above the upper limits of storage register 33, there will be an absence of signal from OR gate 63; thus, when the interrogate signal is applied to control AND gate 62, a signal is applied to OR gate 65 which activates above upper limits indicator 56. When data is received which is below the lower limits of storage register 23, the logic that occurs is not as complicated. Let it be assumed that the data received is any number less than the limit of storage register 23 and again 110 has been selected as the center value, which means that the lower limit for storage register 23 is 105, as seen in Table I. Now, for example, if 104 is the data received from digital voltmeter 11, there will be an absence of signal from OR gate 63 since it is less than the lower limit of 105 for storage register 23 and also there is an absence of a signal from OR gate 65 since it is obviously not above upper limits and an applied interrogate signal to control AND gate 64 will activate below lower limits indicator 57.

Figure 2:
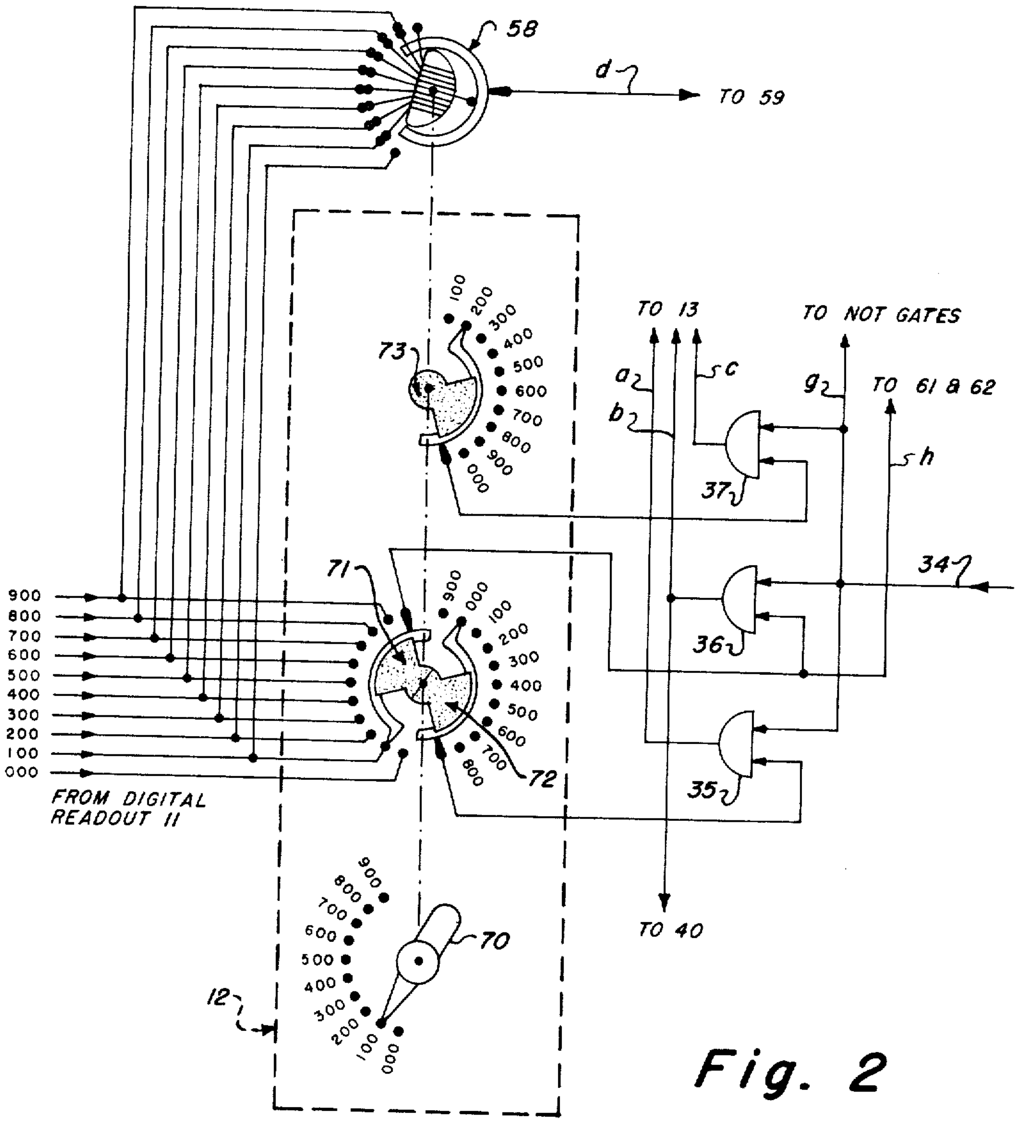
FIG. 2 is a schematic of a ganged switch for selecting the first significant digit.

Referring to FIGURE 2, there is shown schematically the first significant digit selector switch 12 of FIGURE 1. The ten conductors for the 100's inputs are terminated and coded with numbers 000 through 900, these numbers corresponding directly with the numbers placed on a control panel which provides an indication for the convenience of an operator for selecting the first significant digit by the rotation of selector knob 70. Conductors from the 100's inputs are shown connected to the terminals of switch deck 71, and these same conductors are connected in parallel to the terminals of switch deck 72 and the terminals of switch deck 73. To eliminate a confusing complex of connecting lines, the conductors to switch decks 72 and 73 are not shown. The switches are of the wafer type, each having a conductive wiper which provides continuity between a selected unit conductor from the digital voltmeter to an output conductor. These conductors are the 100's inputs described above. Each of the wipers are attached to a common shaft which is rotated by selector knob 70. Switch decks 71, 72, and 73 each provide continuity between the 100's inputs and one of the inputs of AND gates 36, 35, and 37, respectively. To describe the different positions of the wipers in each deck with respect to the other decks, let it be assumed that the first significant digit selected is 1, which means that selector knob 70 is rotated to numerical 100. In this position the wiper of switch deck 71 will contact the terminal connected to 100 of the 100's inputs and any signal on this conductor will be applied to the input of AND gate 36. Also, with selector knob 70 at 100, the wiper of switch deck 72 connects to the 000 conductor; and if a signal is on this conductor, it will be applied to the input of AND gate 35. This signal is important for activating logic circuits when the second digit selected may be 00 since a numerical deviation from the selected center value may fall within the limits of the storage registers. This possibility will be better understood in connection with the description of switch 13 in FIGURE 3. The wiper of switch deck 73 makes contact with the terminal connected to the 200 of the 100's inputs conductor and, if a signal is on this conductor, it will be applied to the input terminal of AND gate 37. This signal can be important if the second digit selected is 90 because a value of 200 may be within limits of the storage registers if, for example, 195 had been selected for the center value. The logic that occurs with this possibility will be better understood in the description of FIGURES 3 and 4. The operation of OR gate 58 was explained above in describing the logic circuit for indicating when an item under test is above the limits of the storage registers and is shown here schematically in FIGURE 2. This OR gate is a rotary switch which is rotated by common shaft of selector knob 70. The ten conductors for the 100's inputs are shown connected to OR gate 58 which are parallel to the terminals of switch deck 71. In this switch section, conductive wiper 74 provides continuity between conductor *d* and all terminals that are one digit higher than the one selected on selector knob 70. In the example given above, selector knob 70 is positioned for 100, which means that OR gate 58 will pass a signal on conductor *d* for any signal received on any of the conductors for 200 and above.

Figure 3:
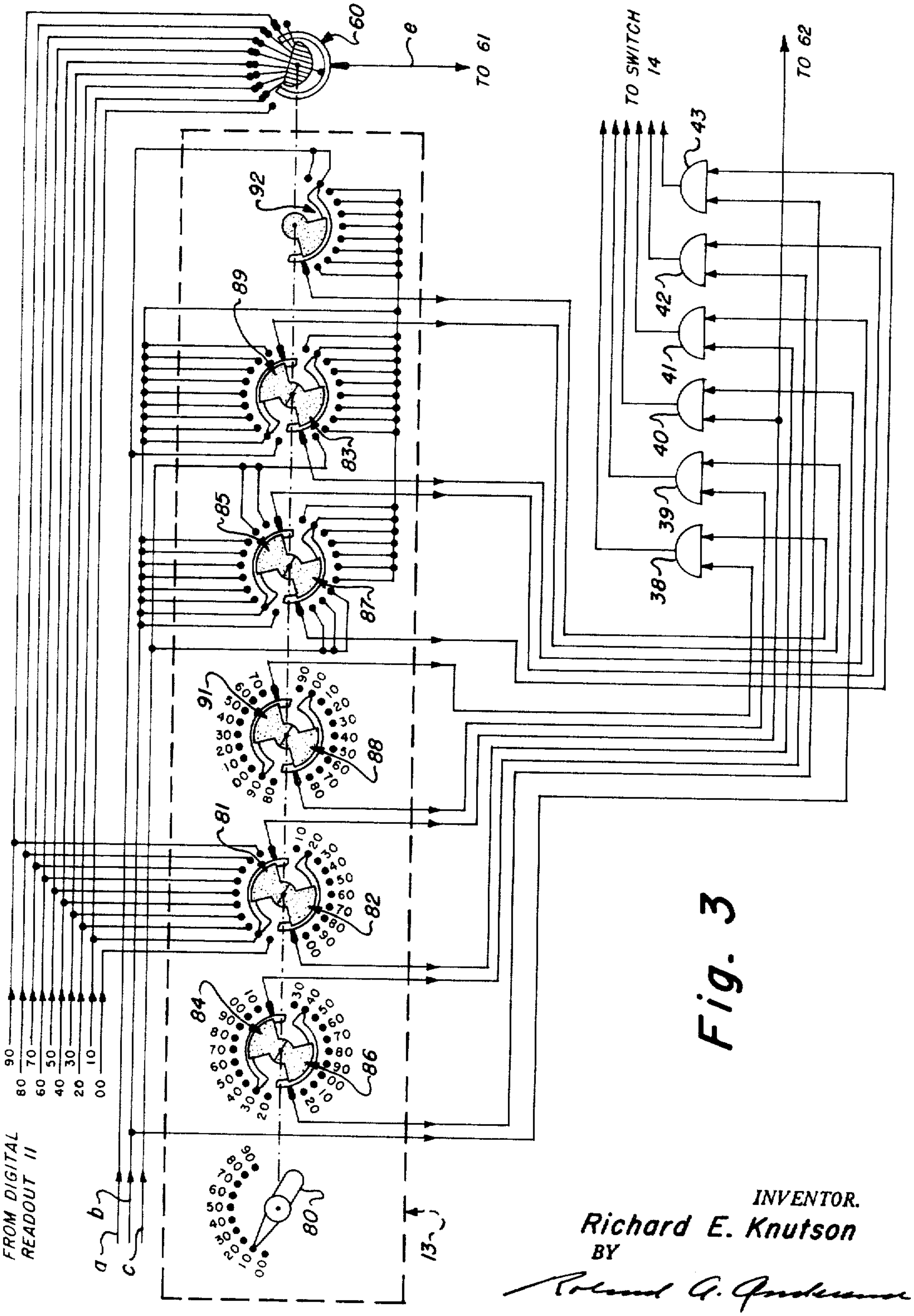
FIG. 3 is a schematic of a ganged switch for selecting the second significant digit.

In FIGURE 3 there is shown schematically the various switch decks, including OR gate 60, all connected to a common shaft and to selector knob 80. This knob, like selector knob 70 for selecting the first significant digit, is on a panel for the convenience of an operator for selecting the second significant digit indicated on the panel in steps between 00 to 90. To avoid the complex of connecting lines, only the conductor to the terminals of switch deck 81 and to the terminals of OR gate 60 are shown. It should be understood that parallel conductors are connected to the terminals of the rest of the switch decks according to coding of the 10's inputs. For the convenience of describing the logic and conductive paths of the second significant digit selector switch, selector knob 80 and the switch decks are in the position they would assume for connecting to the 10's inputs and 10 has been selected. Let it further be assumed that from the 100's inputs 100 has been selected and that the 5–9 position has been selected on rotary switch 14. This will mean that the number of increments to be added to the center value is 5 and any unit received through 9 will be stored in the center storage register. In the assumed position, switch deck 81 will provide continuity between a signal received from 10 in the 10's inputs and an input to AND gate 40. This AND gate would be activated if the first value of 100 were received and transmitted on conductor *b*. Should a signal from 20 in the 10's inputs be received, switch deck 82 will provide continuity for one of the inputs of AND gate 41 and a second signal from conductor *b* through switch deck 83 will activate a storage register because it is within the limits of the assumed value selected. In Table I, the assumed center value is 115 through 119 and storage register 29 stores 120 through 124 and storage register 30 stores 125 through 129, and so on through the other registers. Looking at switch deck 84, it can be seen that continuity is provided between 30 of the 10's inputs and one of the inputs of AND gate 42 and, if a signal is received from 30 and a signal from conductor *b* through switch deck 85, AND gate 42 will be activated and the value stored in either of storage registers 31 or 32 as seen from Table I. When a signal is received on unit 40, continuity is provided through switch deck 86 to one of the inputs of AND gate 43 which can be activated by a signal from conductor *b* through switch deck 87. This value will be stored, as can be seen in Table I, because the last storage register 33 will store any value received between 140 and 144. If a value is received which is less than the center value for storage register 28, a signal from 00 in the 10's inputs is received whereby continuity is provided for this signal through switch deck 88 to one of the inputs of AND gate 39 which will be activated if another signal is received from conductor *b* through switch deck 89. Table I shows that a value between 110 to 114 would be stored in descending storage register 27. There is one more possibility that can occur when a value is received and falls within the limits of the storage registers. Let it be assumed a value of 92 is received, which means that the signal for the 100's inputs is 000 and the signal for the 10's inputs is 90 and the units inputs is 2. Switch deck 91 will provide continuity for a signal received from 90 in the 10's inputs which will be applied to one of the inputs of AND gate 38. From the explanation of the first significant digit selector switch described in FIGURE 2, it should be noted that switch deck 72 provides continuity between the 000 in the 100's inputs and AND gate 35 which, in turn, provides a signal on conductor *a* when the interrogate signal is provided. This signal on conductor *a* is transmitted through switch deck 92, seen in FIGURE 3, to the other input terminal of AND gate 38 which will be stored in the last input storage register because, in the value assumed for the center value of 115 to 119, the last storage register 23 will store a value received between 90 to 94. OR gate 60 is connected and operates in a similar manner to OR gate 58 of FIGURE 2 except that all individual signals in the 10's inputs will be passed through if they are one digit or more above the significant digit selected.

Figure 4:
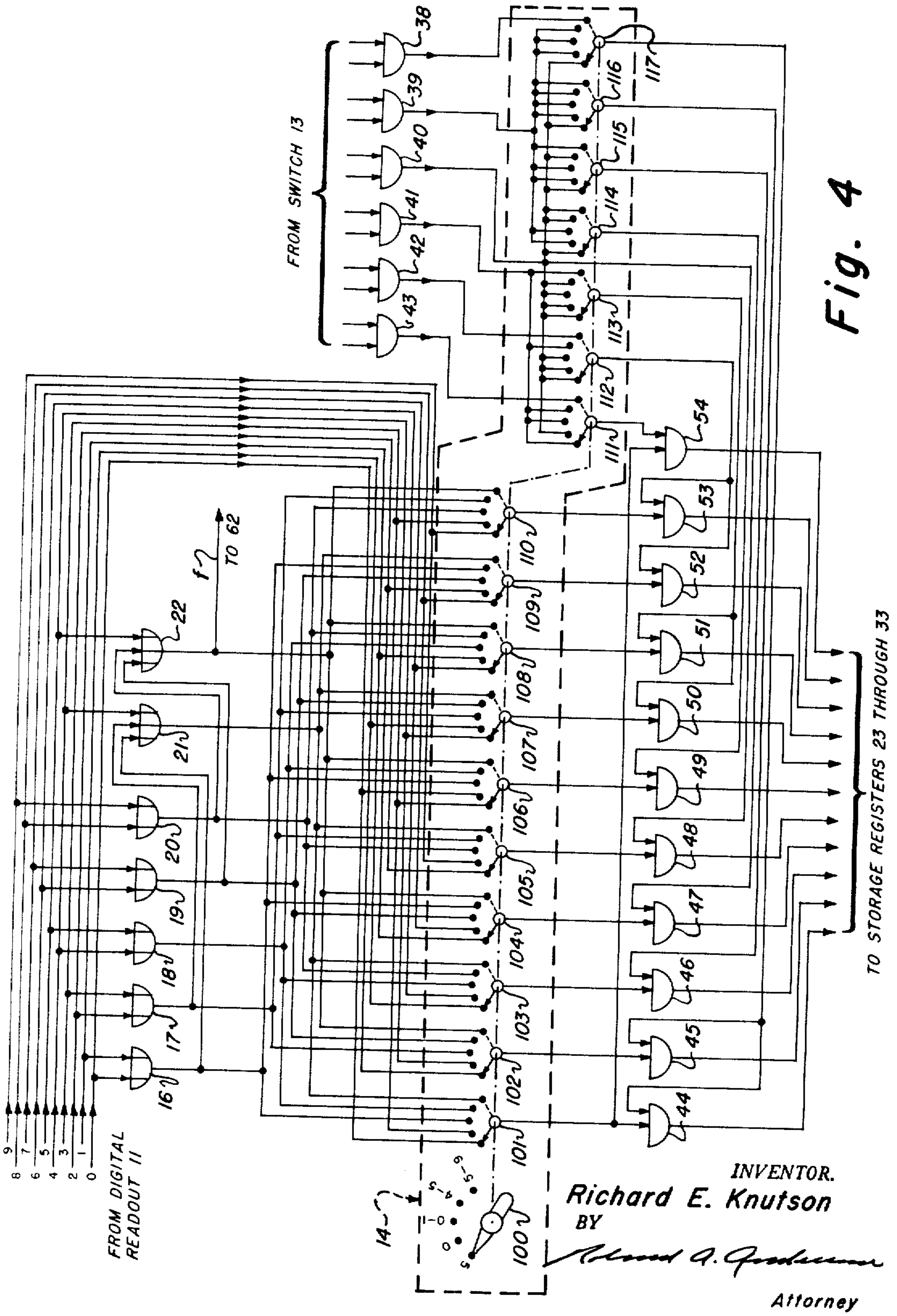
FIG. 4 is a schematic of a ganged switch for selecting the third significant digit and the increment to be added if desired.

Referring to FIGURE 4, there is shown the third significant digit and increment selector switch, including OR gates 16 through 22 which form a part of the switch. To aid in describing the logic that occurs, combining AND gates 38 through 43 and output AND gates 44 through 54 are included in the figure. For convenience of illustration, combining AND gates 38 through 43 are in reverse from that shown in FIGURE 1. Selector knob 100, like selector knobs 70 and 80, is located on a panel for the convenience of the operator to select the third significant digit and the increment that will be added to the storage registers if desired. Switch decks 101 through 117 are of the rotary type and are connected to a common shaft which is rotated by selector knob 100. All conductors to the switch decks and OR gates are shown for convenience of tracing conductive paths.

An explanation of the logic that occurs for various positions of selector knob 100 will be described with examples and reference to Table I. Let it be assumed, as in previous examples, that the first and second significant digit selected are 1 or 100 from the 100's inputs or 10 from the 10's inputs. Let it further be assumed that selector knob 100 is in position shown for a third significant digit of 5. All switch decks 101 through 117 are also shown with contacts made for this position selected. With reference to Table I, it is seen that the center value for storage register 28 is 115 and the values for storage registers 23 and 33 on each end are 110 and 120, respectively. It should be noted that the value of the third digit for the end storage registers is the same; thus a parallel connection is made from one of the inputs to AND gate 44 to one of the inputs of AND gate 54. From previous examples, it was learned that if the first and second digit are received as selected, AND gate 40 combines these digits to apply a signal to AND gate 49. Tracing the conductive path through switch deck 106, continuity is provided between unit 5 of the units inputs to the second input of AND gate 49 to activate the center storage register 28 and store 115 as illustrated numerically in Table I. Assuming that a signal in the units inputs is on 9 and the first and second digits are 1 or 100 from the 100's inputs or 10 from the10's inputs, with selector knob 100 still in the same position of 5, switch deck 110 will provide continuity to one of the inputs of AND gate 53.

Since the first two values are 100 and 10, AND gate 40 is activated providing a signal through switch deck 112 to the other input of AND gate 53 and storage register 32 will be activated for the value 119 as seen in Table I. For an explanation of how an increment is added to the storage registers, let it be assumed that selector knob 100 is in position 5–9 and the first and second values selected are still 100 and 10. From Table I it can be seen that any one of the storage registers can store one of five different values. This means that the third significant digit can be an increment of 5. To describe the logic that occurs with selector knob 100 in the position 5–9, all switch decks 101 through 117 show a dotted line indicating this new position. From Table I it can be seen that center storage register 28 will store any value received between 115 and 119. The first and second values of 100 and 10 will be combined as before in AND gate 40 thus applying a signal to one of the inputs to AND gate 49. The other signal for AND gate 49 comes through switch deck 106 by way of a conductor connected directly to the output of OR gate 22. This OR gate has one input connected directly to the unit 5 conductor, a second input connected to the output of OR gate 20 which has inputs connected directly to the 8 and 9 unit conductors and a third input connected directly to the output of OR gate 19 which has inputs connected directly to the 6 and 7 unit conductors. Since an OR gate will provide continuity for any signal received on any input, it can be seen that AND gate 49 will receive a signal for any unit received between 5 and 9. For additional explanation, let it be assumed that a 000 signal is received from the 100's inputs and 90 is received from the 10's inputs and that any number between 0 and 4 could be received for the units. Referring to FIGURE 2, the 000 input signal is transmitted through switch deck 74 to one of the inputs of AND gate 35 and an interrogate signal applied to the other input will provide an output signal through switch deck 92 of FIGURE 3 to one of the inputs of AND gate 38. The 90 input signal will be transmitted through switch deck 91 of FIGURE 3 into the other input of AND gate 38 which will provide an output signal through switch deck 117 of FIGURE 4 to one of the inputs of AND gate 44. The second input signal to AND gate 44 comes from the output of OR gate 21 through switch deck 101. A first input of OR gate 21 is connected to the unit 4 conductor; a second input is connected to the output of OR gate 17 which has its inputs connected to the 2 and 3 unit conductors; and a third input is connected to the output of OR gate 16 which has its inputs connected to the 0–1 unit conductors. From the last example and with reference to Table I, it can be seen that storage register 23 will store values received between 90 and 94 with an increment of 5. It is interesting to note that AND gates 44 and 45 have a common input connection through switch deck 117; however, if the conductive path is traced for AND gate 44, it can be seen that it is connected to OR gate 21 which receives signals from 0 to 4 while the conductive path for AND gate 45 is connected to OR gate 22 which receives signals from units 5 through 9. This can be seen clearly by referring to Table I and storage registers 23 and 24. Other output AND gates are connected in this manner and function as the two described.

With the explanations and examples given to the digital data sorting logic system as the embodiment of this invention, one skilled in the art can visualize the construction of a histogram from data taken from many items under test having similar characteristics. It should be understood that many variations from the preferred embodiment are possible. For example, by increasing or decreasing the number of storage registers, by employing other increment values, or by having the ability to sense more or less digits, these variations would require the same basic switch logic with the associated gating circuits and would not depart from the spirit of the invention. It is the intention, therefore, to be limited only as indicated by the scope of the following claims.

What is claimed is:

1. A logic system for organizing digital data received from an electrically energized digital readout device into a plurality of storage registers, each individually responsive to numerical values in fixed relation to predetermined center values whereby a frequency distribution of said numerical values may be presented comprising:

(a) a selectively actuable switching means coupled to the output of said readout device for selecting said values, (b) means for applying an interrogating signal to the switching means each time it is desirable to enter a piece of data, (c) means including a first logic circuit coupled to the switching means for combining said numerical values, (d) means including a second logic circuit coupled to first logic circuit for activating individual storage registers in accordance to the value received, (e) and means including a third logic circuit coupled to the switching and interrogating means for indicating values received that are either above or below the numerical values selected for recording in the storage registers.

2. Apparatus as defined in claim 1 wherein the selectively actuable switching means includes separate rotary switches for selecting a first, second, and third significant digit.

3. Apparatus as defined in claim 2 wherein the rotary switch for selecting the third significant digit additionally comprises switch decks for selecting additive increments.

4. A logic system for organizing into a plurality of storage registers digital data received from an electrically energized digital readout device having a plurality of output terminals, each storage register individually responsive to numerical values in fixed relation to predetermined center values whereby a frequency distribution of said numerical values may be presented comprising:

(a) a first, second, and third selectively actuable switching means for selecting a first, second, and third digit where the third switching means includes incremental values to establish the fixed relation of the preselected group of center values, (b) circuit means for coupling between the plurality of output terminals of the digital readout device and the switching means, (c) a plurality of interrogating AND gates coupled to an interrogate signal and the first switching means for applying digital data signals received for the first digit to the second switching means, (d) a plurality of combining AND gates coupled to the second switching means and interrogating means for combining the first and second digital data received, (e) means including logic circuits coupled to the combining AND gates for activating individual storage registers in accordance with the value received, (f) and means including outer limits logic circuits coupled to the first, second, and third selectively actuable switching means and the interrogate signal for indicating values received that are either above or below the numerical values selected for recording in the storage registers.

5. Apparatus as defined in claim 4 wherein the logic circuit means includes output AND gates coupled to the combining AND gates and the third switching means for activating individual storage registers in accordance with the value received.

6. Apparatus as defined in claim 4 wherein the outer limits logic circuit means includes an above upper limits indicator, a first and second OR gate coupled to the first and second switching means, respectively, a unit OR gate coupled to output terminals of the digital readout device, first, second, and third control AND gates coupled to the first, second, and unit OR gates, respectively, and a third OR gate coupled between the control AND gates and the above upper limits indicator, whereby first, second, and unit OR gates passing any digit received that is greater than any of the individual digits selected and initiating a control AND gate, when interrogated, and activating through third OR gate the above upper limits indicator.

7. Apparatus as defined in claim 6 wherein the outer limits logic circuit means additionally comprises a below lower limits indicator, a control OR gate coupled to the storage registers, a lower limits control AND gate coupled between the control OR gate and the below lower limits control AND gates whereby the lower limits control AND gate, when interrogated, activating the below lower limits indicator in the absence of activation of the control and third OR gates.

8. A logic system for organizing into a plurality of storage registers digital data received from an electrically energized digital readout device having a plurality of output terminals, each storage register individually responsive to numerical values in fixed relation to predetermined center values whereby a frequency distribution of said numerical values may be presented comprising:

(a) a first selectively actuable switching means for selecting a first significant digit,
(b) a second selectively actuable switching means for selecting a second significant digit,
(c) a third selectively actuable switching means for selecting a third significant digit and an additive incremental value to establish the fixed relation of the preselected group of center values,
(d) circuit means for coupling from a plurality of output terminals one for each digit within the first, second, and third digit of the digital readout device to respective first, second and third switching means,
(e) means for interrogating the second and third switching means each time it is desirable to enter a piece of data,
(f) a first plurality of AND gate circuits for combining the first and second digits through said third switching means,
(g) a first plurality of OR gate circuits for introducing the third digit through said third switching means for combining with said second and third digits,
(h) a second plurality of AND gate circuits responsive to the combined digits and interrogating means for activating the individual storage register,
(i) a second plurality of OR gate circuits coupled to switching means and responsive to all digits from the digital readout device that are above the limits of the storage register,
(j) a first indicating means adapted to be activated when a digit received is above the upper limits of the storage registers,
(k) a second indicating means adapted to be activated when a digit received is below the lower limits of the storage registers,
(l) a plurality of control AND gate circuits responsive to the interrogating means and the second plurality of OR gates and including a single OR gate responsive to the control AND gates for activating first indicating means, and
(m) a single control AND gate coupled to the storage registers through an OR gate for activating the second indicating means, when interrogated, and in the absence of activation of the storage registers and the first indicating means.

References Cited

UNITED STATES PATENTS 2,951,235 8/1960 Welsh ............. 340—172.5

OTHER REFERENCES

Dawe, P., A Histogramming Counter for Magnetic Tape Data, in Electronic Engineering, 3r (393), pp. 680–684, November 1960.

PAUL J. HENON, *Primary Examiner.*

J. P. VANDENBURG, *Assistant Examiner.*